(12) United States Patent
Ogawa et al.

(10) Patent No.: US 7,520,949 B2
(45) Date of Patent: Apr. 21, 2009

(54) TIRE MANUFACTURING METHOD AND TIRE

(75) Inventors: Yuichiro Ogawa, Kodaira (JP); Chihiro Sawada, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 222 days.

(21) Appl. No.: 10/566,165

(22) PCT Filed: Jul. 14, 2004

(86) PCT No.: PCT/JP2004/010046

§ 371 (c)(1),
(2), (4) Date: Oct. 30, 2006

(87) PCT Pub. No.: WO2005/009725

PCT Pub. Date: Feb. 3, 2005

(65) Prior Publication Data
US 2007/0187016 A1 Aug. 16, 2007

(30) Foreign Application Priority Data
Jul. 29, 2003 (JP) ............................. 2003-202989

(51) Int. Cl.
*B29D 30/00* (2006.01)
*B29D 30/24* (2006.01)
*B29D 30/26* (2006.01)

(52) U.S. Cl. ................. 156/110.1; 156/394.1; 156/396; 156/414; 156/415

(58) Field of Classification Search ............... 156/110.1, 156/111, 394.1, 396, 403, 414, 415, 416, 156/417
See application file for complete search history.

(56) References Cited

U.S. PATENT DOCUMENTS 4,917,164 A * 4/1990 Ushikubo et al. ............ 152/517

FOREIGN PATENT DOCUMENTS

| JP | 2003-071950 A | 3/2003 |
| JP | 2003-159758 A | 6/2003 |
| WO | WO02/060676 A1 | 8/2002 |

* cited by examiner

*Primary Examiner*—Justin Fischer
(74) *Attorney, Agent, or Firm*—Sughrue Mion, PLLC

(57) ABSTRACT

In producing a side-reinforced type runflat tire in which side reinforcing rubbers with generally crescent-shaped sections are interposed between a carcass and an inner liner, the first drums 11a, 11b on which the side-reinforcing rubbers are to be attached are so configured that their diameter do not substantially fluctuate along the axial direction. The expanding operation of the first drum, the mutually approaching operation of the first drums 11a, 11b and the approaching operation of the bead gripping rings 30A are synchronized. As a result, there is provided a tire and a method of its production capable of being produced by a multi-size mixed flow production system consisting of minimum equipments and of preventing air inclusions and wrinkles between the carcass member 4A and the side-reinforcing rubber 2A.

4 Claims, 11 Drawing Sheets

(a)

(b)

(c)

(a)

(b)

(c)

(a)

(b)

(c)

(a)

(b)

(c)

(a)

(b)

TIRE MANUFACTURING METHOD AND TIRE

TECHNICAL FIELD

The present invention relates to a method of manufacturing a runflat tire in which a side-reinforcing rubber layer with a generally crescent-shaped section is interposed between a carcass and an inner liner of a side portion of the tire, and especially a method of manufacturing a tire in which the tire can be produced by a multi-size mixed flow production system consisting of minimum equipments as well as no air inclusions and wrinkles occur between the inner circumferential face of the carcass and the side-reinforcing layer. The present invention also relates to such a tire.

RELATED ART

As a radial runflat tire which allows a vehicle to run even in a state where the tire is blown out, known is a so-called side-reinforced type runflat tire 200 provided with a side-reinforcing rubber layer 202 of a generally crescent-shaped section in a tire side portion, as shown in FIG. 10.

In FIG. 10, reference numerals 204, 206, 207, 208, 210, 212, 214 and 216 respectively denote a carcass, a bead core, a bead filler, an inner liner, a sidewall, a tread, a belt and a canvas chafer.

A method of building a green tire comprising the steps of winding an inner liner rubber around a bund drum in which the diameter does not substantially fluctuate along the axial direction; setting a carcass member and bead cores; folding back them and attaching a sidewall rubber thereon; transferring them to a shaping drum; and setting a belt member, a tread rubber and the like is know as an example of a common method of producing a green tire of a radial tire.

When the green tire for the runflat tire 200 is built according to this method, an inner liner rubber 208A, a side reinforcing rubber 202A, two plies constituting a carcass member 204A are attached on a bund drum 209 and are integrated to form a cylindrical intermediate member 218, as shown in FIG. 11.

An ordinal radial tire does not have a side-reinforcing rubber 202A, so that the band drum may have a flat surface. On the other hand, a runflat tire needs a side-reinforcing rubber 202 with a generally crescent-shaped section, so that in order to prevent air inclusions and wrinkles between these members, which may occur when a flat carcass member 204A is attached onto the outer circumferential face where the thick side-reinforcing rubber 202A protrudes, the side-reinforcing rubber 202A is disposed in a groove 220 which is formed on the outer circumferential surface of the band drum 209 and the side-reinforcing rubber 202A and a inner liner rubber 208A are so attached that they form a outer circumferential face being flat in the width direction (see, for example, Patent Document 1).

Patent Document 1: Japanese Patent Application Laid-open No. 2003-071950

Various widths and thickness of the side-reinforcing rubber 202A, however, exist in accordance with tire sizes, and thus the grooves 220 with various sizes are needed to fit the sizes of the side-reinforcing rubber 202A.

Consequently, in order to manufacture such tires with using a multi-size mixed flow production system, various band drums 209 having grooves with different widths, capacities, shapes and positions have to be prepared in accordance with the positions in the width direction and the sectional shapes of the side-reinforcing rubber 202A which vary depending on the tire size. Thus, it is necessary to have wide variety of band drums 209, which may involve problems of remarkably increasing installation spaces and investments.

The groove portion of the band drum 209 may be configured as a replaceable adaptor, but another problem of time-consuming replacement operation of the adaptor arises in this case.

The present invention has been achieved with taking these problems into consideration and is intended to provide a method of manufacturing a runflat tire and a tire in which the tire can be produced by a multi-size mixed flow production system of minimum equipments as well as no air inclusions and wrinkles are produced between the inner circumferential face of the carcass and the side-reinforcing layer.

DISCLOSURE OF THE INVENTION

The present invention has been achieved to accomplish the above-mentioned object, and its gist, constitution and operation are described below.

Aspect <1> is a method of manufacturing a tire provided with a carcass toroidally extending between both bead cores, an inner liner disposed in the inner circumferential side of the carcass and side-reinforcing rubber layers with generally crescent-shaped section interposed between the carcass and the inner liner, the method comprising;

a first step of gripping each of a pair of bead cores with a bead-gripping ring, said bead cores being so disposed that they contact with the outer peripheral face of a cylindrically-shaped carcass member over an entire periphery and are spaced from each other in the axial direction;

a second step of attaching the side-reinforcing rubbers on the peripheries of a pair of a first expansible/contractible drum with a diameter being substantially the same along the axial direction, said drums being provided in such a manner that they can mutually move back and forth on the same axial line;

a third step of inserting said first drums into the radially inward of said carcass member, radially expanding the drums, pressing the side-reinforcing rubber against the inner circumferential face of the carcass member to form a first cylindrical member and thereafter removing the first drums from the radially inward of the first cylindrical member;

a forth step of attaching at least one member including an inner liner rubber on the periphery of a second expansible/contractible drum with a diameter being substantially the same along the axial direction to form a second cylindrical member;

a fifth step of inserting said second drum on which said second cylindrical member is attached into the radially inward of said first cylindrical member, radially expanding the drum, pressing the second cylindrical member against the inner circumferential face of the first cylindrical member to form a third cylindrical member; and a sixth step of deforming a part of the third cylindrical member extending between the both bead cores into a toroidal shape, attaching a belt member and a tread rubber thereon to form a green tire, and setting and vulcanizing the green tire in a mold, wherein the radially-expanding operation of the first drums, the mutually-approaching operation of the first drums and the mutually-approaching operation of the bead-gripping rings are so synchronized in the third step that the inner circumferential face of the carcass member is tightly pressed against the outer circumferential face of the side-reinforcing rubber.

According to the aspect <1>, the first drums for attaching the side-reinforcing rubber are so configured that their diameters do not substantially fluctuate along the axial direction, and thus the tire can be produced by a multi-size mixed flow production system consisting of minimum equipments. Moreover, since the expanding operation of the first drums, the mutually-approaching operation of the first drums and the mutually-approaching operation of the bead-gripping rings are so synchronized in the third step that the inner circumferential face of the carcass member is tightly pressed against the outer circumferential face of the side-reinforcing rubber, air inclusions and wrinkles can be prevented from occurring between these members.

Aspect <2> is the method of manufacturing a tire according to <1>, wherein, assuming that $P_1$ is the radially outermost point in the meridian line section of the side-reinforcing rubber after the first drum having been expanded, $P_2$ is the axially innermost point, $P_3$ is the axially outermost point, $r_1$ is the radial distance between $P_1$ and $P_2$, $d_1$ is the axial distance between $P_1$ and $P_2$, $d_2$ is the axial distance between $P_2$ and $P_3$, $s_1$ is the peripheral distance between $P_1$ and $P_2$, and $s_2$ is the peripheral distance between $P_2$ and $P_3$ via $P_1$, while the pair of the first drums are radially expanded in the third step, the radial expansions of the pair of the drums are synchronized, as well as the space between the first drums is decreased by $(2 \times (s_1 - d_1))$ and the space between the bead-gripping rings is decreased by $(2 \times (s_2 - d_2))$ after the point $P_1$ abuts the inner circumferential face of the carcass member and before the first drums are radially expanded by $(2 \times r_1)$, so that the operations of the first drums and the bead-gripping rings are synchronized.

According to the aspect <2>, the outer circumferential face of the side-reinforcing rubber is pressed against the inner circumferential face of the carcass member while the operations of the first drums and the bead-gripping rings are synchronized, as mentioned in the above, so that wrinkles and air inclusions can be more certainly prevented.

Aspect <3> is the method of manufacturing a tire according to <1> or <2>, wherein in the second step, when the side-reinforcing rubber is applied, a continuous unvulcanized rubber ribbon is wound around in plural turns on the periphery of the first drum.

According to the aspect <3>, when the side-reinforcing rubber is applied, the continuous unvulcanized rubber ribbon is wound around in plural turns on the periphery of the first drum, so that it is not necessary to prepare various kind of side-reinforcing rubber elongated members with different sectional shapes and change them depending on an order of the production. Further, various sizes of the tire can be accommodated by simply changing means for lamination or the number of the lamination of the continuous unvulcanized rubber ribbon in a single size, which enables an efficient production.

Aspect <4> is a tire provided with a carcass toroidally extending between both bead cores, an inner liner disposed in the inner circumferential side of the carcass and side-reinforcing rubber layers with generally crescent-shaped section interposed between the carcass and the inner liner, the tire comprising the side-reinforcing layer consisting of a continuous rubber ribbon wound around in plural turns.

According to the aspect <4>, as the side-reinforcing rubber layer consists of the continuous rubber ribbon wound around in plural turns, the production of a tire with the multi-size mixed flow production system may get more efficient, as mentioned in the above. In addition, the side-reinforcing rubber does not have a circumferential seam extending continuously from one end to the other end in the width direction, so that the uniformity of the tire is not adversely affected.

BEST MODE FOR CARRYING OUT THE INVENTION

Figure 1:
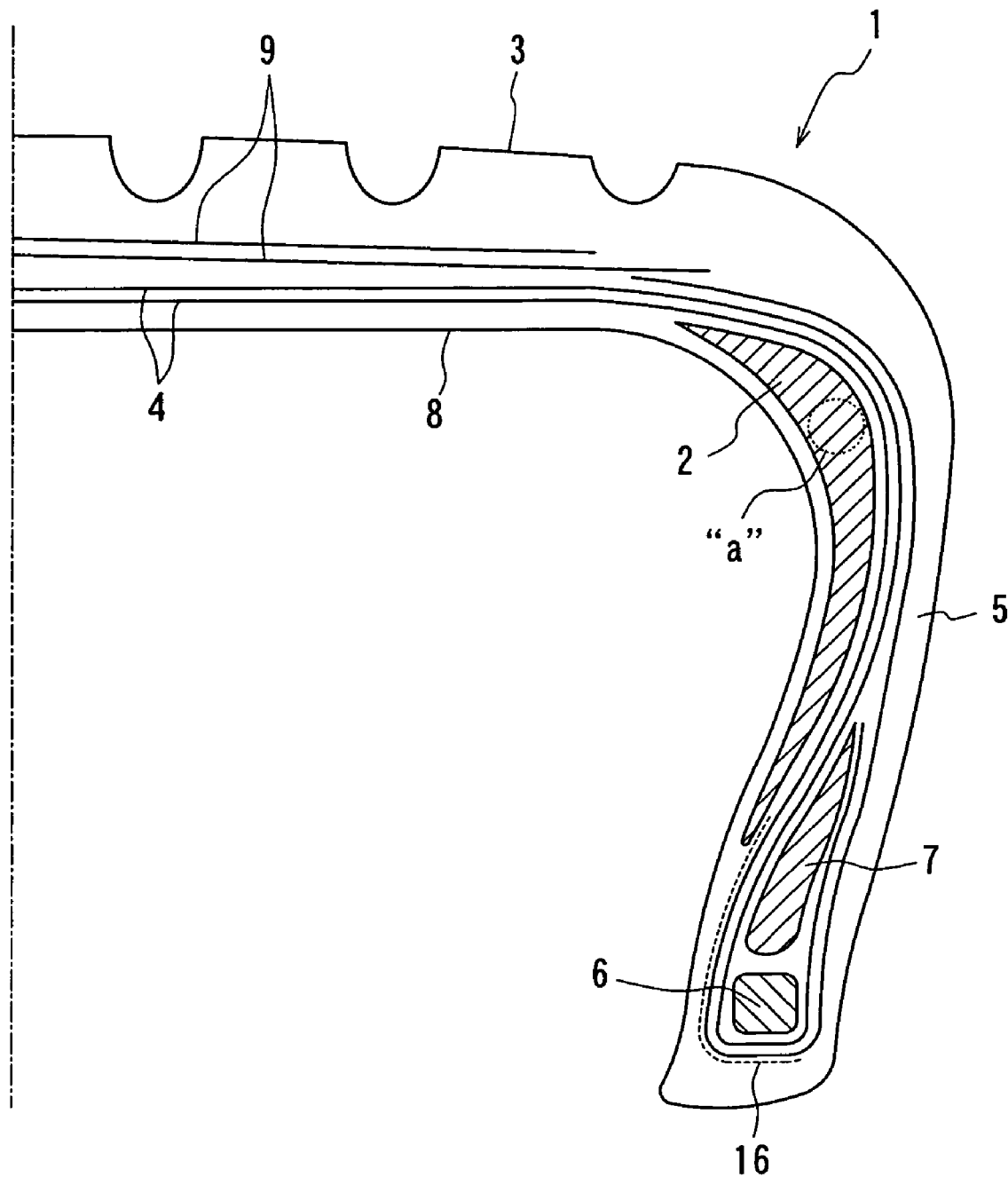
FIG. 1 is a meridian sectional view of one embodiment of the present invention.

Embodiments according to the present invention are described below with reference to FIGS. 1-9. FIG. 1 is a meridian sectional view of a tire 1 according to one embodiment of the present invention. The tire 1 is a so-called side-reinforced type runflat tire, and a side-reinforcing rubber layer 2 with a generally crescent-shaped section is disposed between a carcass 4 and an inner liner 8 on each side of the tire 1. In FIG. 1, the reference numeral 3, 5, 6, 7, 9 and 16 respectively represent a tread, a sidewall, a bead core, a bead filler, a belt and a canvas chafer.

Figure 2:
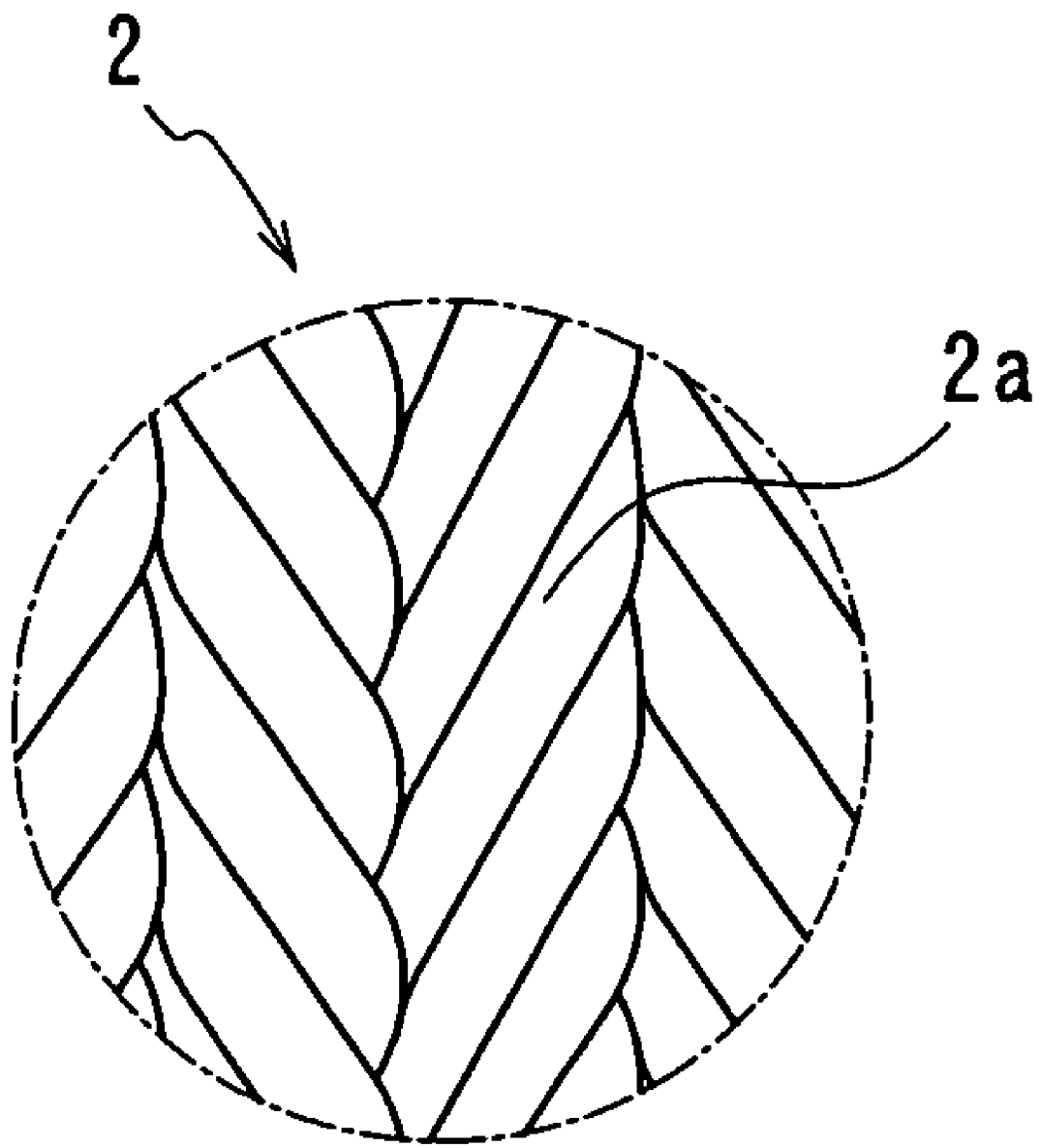
FIG. 2 is a detailed sectional view showing the part "a" in FIG. 1.
Figure 3:
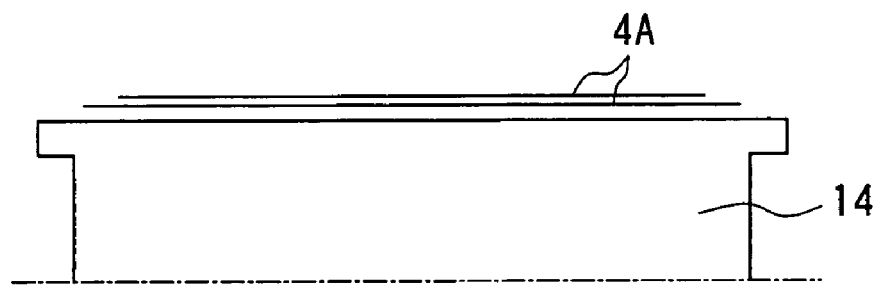
FIG. 3 is a meridian sectional view showing a state of a green tire during the manufacturing.
Figure 3:
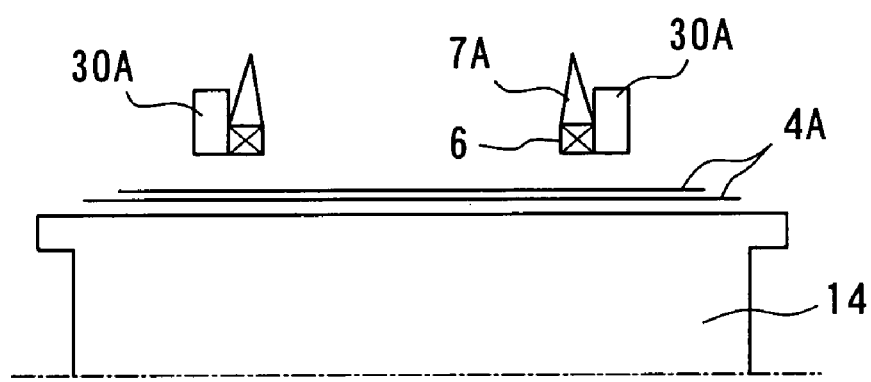
Figure 3:
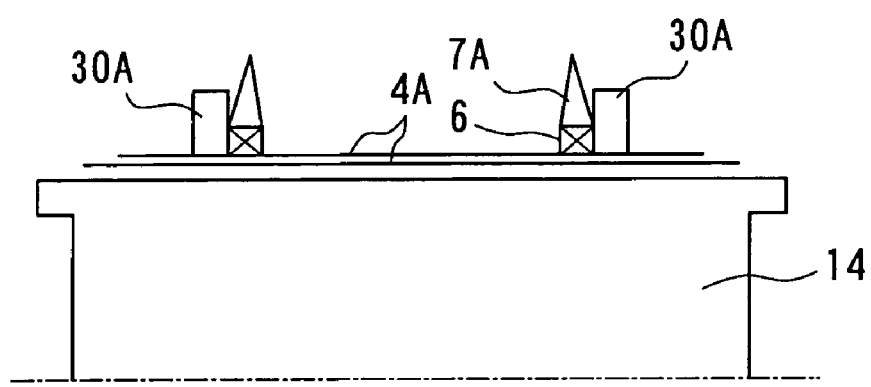
Figure 4:
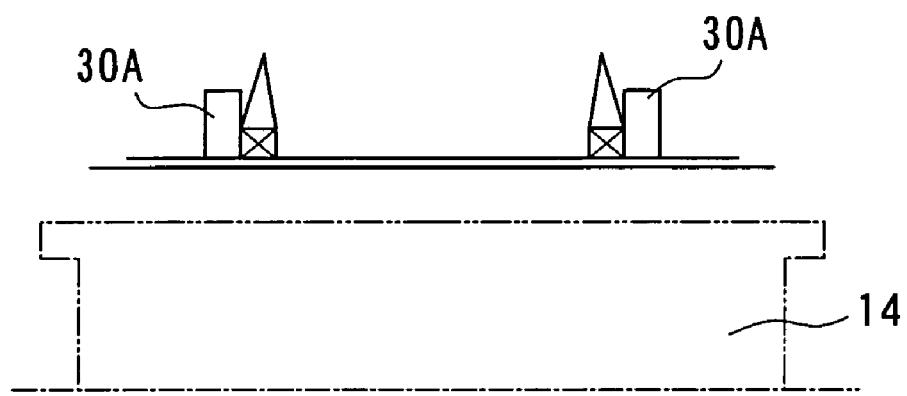
FIG. 4 is a meridian sectional view showing a state in the step following FIG. 3.
Figure 4:
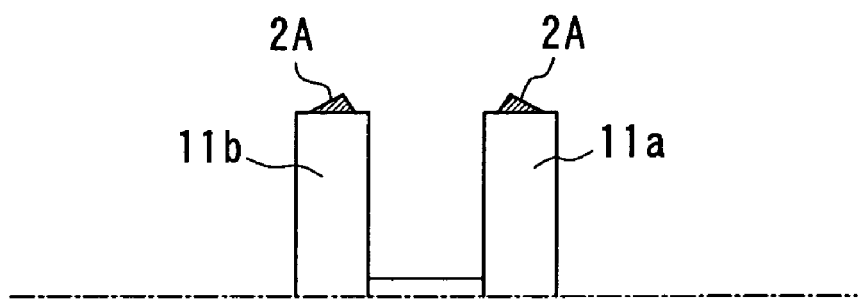
Figure 4:
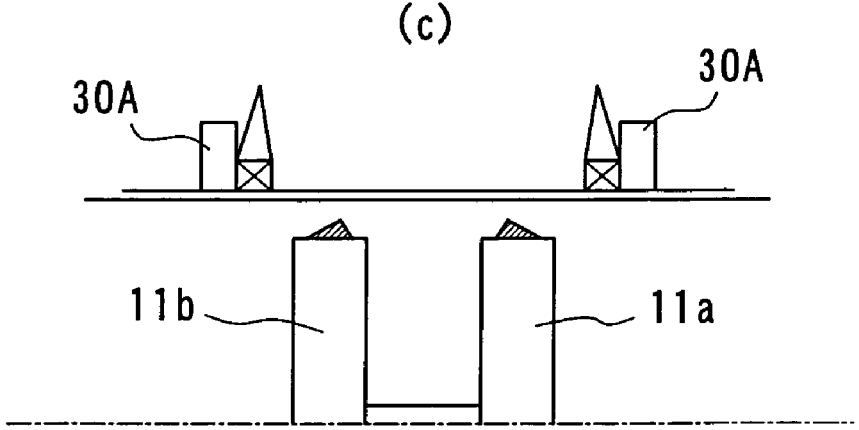
Figure 5:
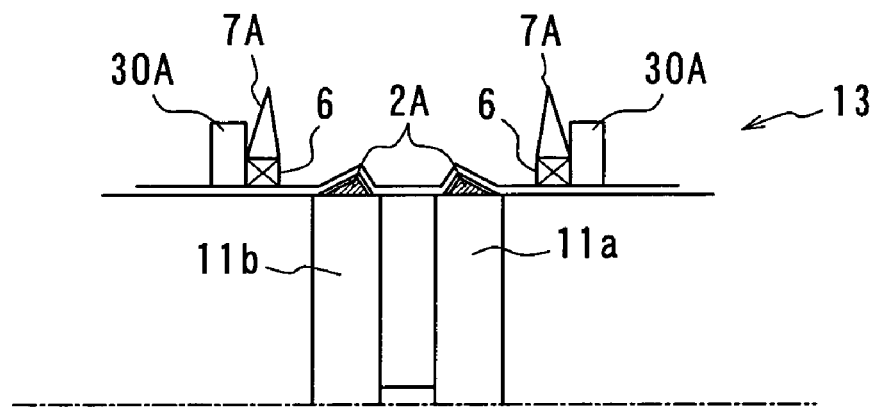
FIG. 5 is a meridian sectional view showing a state in the step following FIG. 4.
Figure 5:
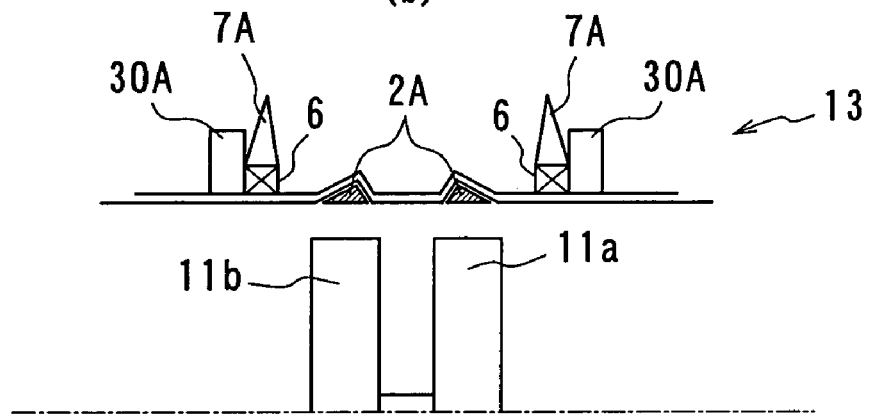
Figure 5:
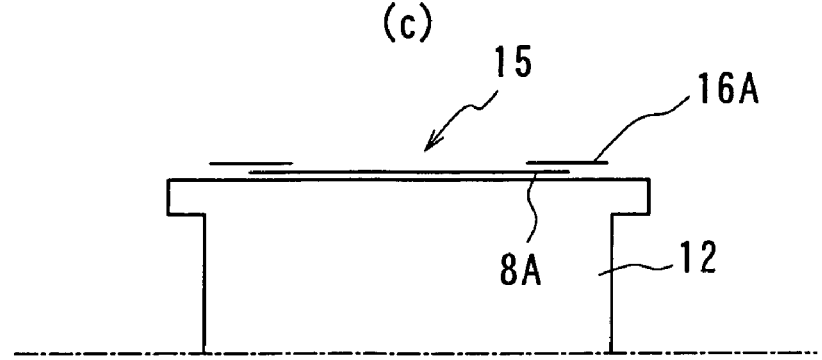
Figure 6:
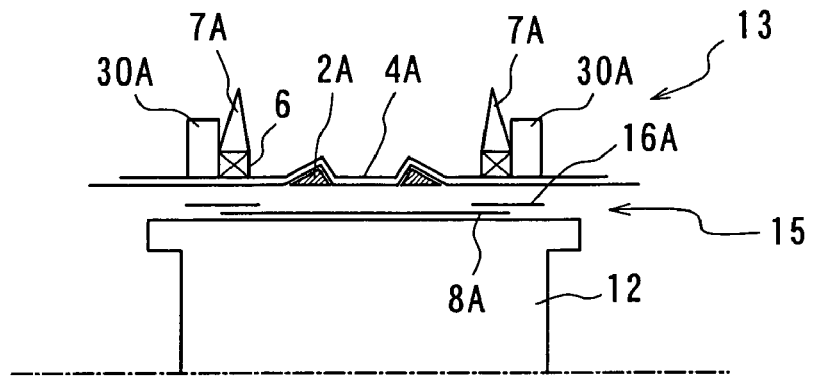
FIG. 6 is a meridian sectional view showing a state in the step following FIG. 5.
Figure 6:
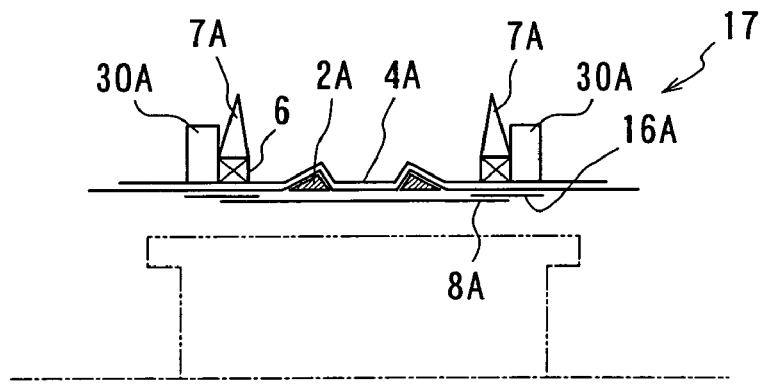
Figure 6:
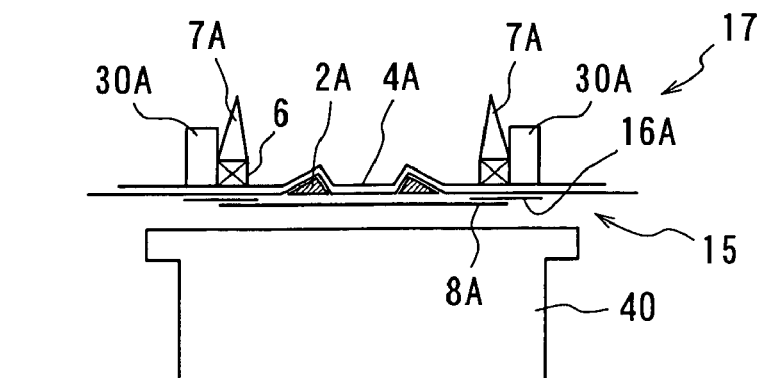
Figure 7:
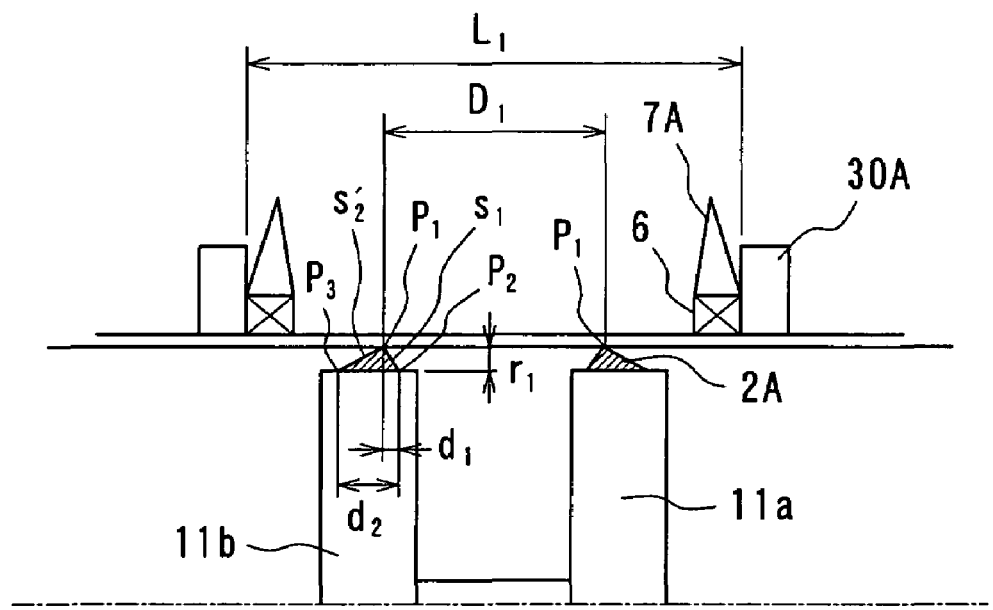
FIG. 7 is a meridian sectional view of the side-reinforcing rubber for explaining synchronized operations of the first drums and the bead gripping rings.
Figure 7:
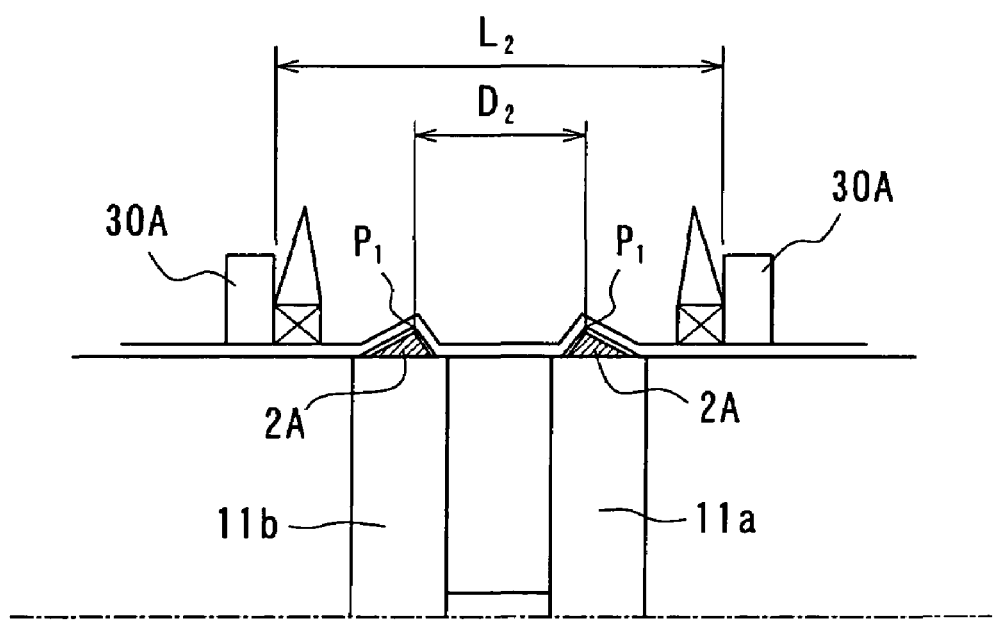

FIG. 2 is a detailed sectional view showing the part "a" in FIG. 1. The side-reinforcing rubber layer 2 is configured by laminating a continuous rubber ribbon 2a which is wound around in plural turns.

FIGS. 3-6 are meridian sectional views each showing a state of a green tire during the manufacturing at each step. In the first step, as shown in FIG. 3(a), two carcass plies are attached on a periphery of a radially expansible/contractible carcass band drum 14 one by one to form a cylindrical carcass member 4A. Then, as shown in FIG. 3(b), the carcass band drum 14 on which the carcass member 4A is attached is inserted radially inward of a pair of bead-gripping rings 30A for gripping left and right bead cores 6 to which bead filler rubbers 7A are preset. Thereafter, as shown in FIG. 3(c), the carcass band drum 14 is radially expanded to contact the carcass member 4A with the inner circumferential face of the bead core 6 over entire periphery. After that, as shown in FIG. 4(a), the carcass band drum 14 is contracted and is removed from the radially inward position of the carcass member 4A.

In the second step, as shown in FIG. 4(b), each one side-reinforcing rubber 2A is attached on the periphery of each of a pair of first drums 11a, 11b which are so provided as to be able to mutually move back and forth on the same axial line and are expansible/contractible without substantial fluctuations in their diameter along the axial direction.

In the third step, as shown in FIG. 4(c), the first drums 11a, 11b on which the side-reinforcing rubbers 2A are attached are inserted into the radially inward of the cylindrical carcass member 4A which is gripped by the bead-gripping rings 30A. Then, as shown in FIG. 5(a), the first drums 11a, 11b are radially expanded to press the side-reinforcing rubbers 2A against the inner circumferential face of the carcass member 4A, thereby forming the first cylindrical member 13. Thereafter, as shown in FIG. 5(b), the first drums 11a, 11b are radially contracted and are subsequently removed from the radially inward of the first cylindrical member 13.

In the forth step, as shown in FIG. 5(c), an inner liner 8A and canvas chafers 16A are attached sequentially in this order on the second expansible/contractible drum 12 without substantial fluctuations in its diameter along the axial direction to form the second cylindrical member 15.

In the fifth step, as shown in FIG. 6(a), the second drum 12 on which the second cylindrical member 15 is attached is inserted into the radially inward of the first cylindrical member 13. Then, as shown in FIG. 6(b), the second drum is radially expanded to press the second cylindrical member 15 against the radially inward of the first cylindrical member 13 to form the third cylindrical member 17. Thereafter, the second drum is removed from the radially inward position of the third cylindrical member 17.

In the sixth step, as shown in FIG. 6(c), a shaping drum 40 is inserted into the radially inward of the third cylindrical member 17. Then, according to the not-shown conventional method, a part, which extends between the both bead cores 6, of the third cylindrical member 17 is deformed into a toroidal shape. Thereafter, a belt member and a tread rubber are attached on it to form a green tire. The green tire is set in a mold and is vulcanized in the mold to complete the production of the tire.

Among these steps, it is necessary to synchronize all of the radially-expanding operation of the pair of the first drums 11a, 11b, the mutually-approaching operation of the pair of the first drums, and the mutually-approaching operation of the bead-gripping rings during the period of radially expanding the first drums 11a, 11b and pressing the side-reinforcing rubber 2A against the inner circumferential face of the carcass member 4A in the third step, in order to avoid occurring air inclusions and wrinkles between these members. Such a synchronous is preferably carried out in the following manner.

FIG. 7(a) is a meridian sectional view of the side-reinforcing rubber showing in a state where the side-reinforcing rubber 2A begins to contact with the inner circumferential face of the carcass member 4A, and FIG. 7(b) is a meridian sectional view of the side-reinforcing rubber 2A showing in a state where pressing the side-reinforcing rubber 2A against the inner circumferential face of the carcass member 4A has been completed. In these figures, the point $P_1$ represents the outermost point in the radial direction, the point $P_2$ represents the innermost point in the width direction, and the point $P_3$ represents the outermost point in the radial direction of the side-reinforcing rubber 2A. The distance between the points $P_1$ and $P_2$ in the radial direction, i.e. the thickness $r_1$ of the side-reinforcing rubber 2A is designated as $r_1$, the width of $P_1$ and $P_2$ is designated as $d_2$, the peripheral distance from $P_1$ to $P_2$ is designated as $s_1$ and the peripheral distance from $P_1$ to $P_3$ is designated as $s_2$. In this connection, the peripheral distance $s_2$ from $P_2$ to $P_3$ via $P_1$ is designated as $(s_1+s_2)$.

The total extending length of the carcass member 4A extending between the points $P_1$ of the both side-reinforcing rubber 2A is designated as $D_1$ in FIG. 7(a), and becomes $((D_2-2 \times d_1)+2 \times s_1)$ in FIG. 7(b). In order to avoid occurring any wrinkles on the carcass, these total extending lengths should be the same and thus the following equation (1) is derived. Based on the same idea, the following equation (2) is derived for the relationship of the distances $L_1$ and $L_2$ between the right and left bead-gripping rings 30A.

$$D_1 - D_2 = 2 \times (s_1 - d_1) \qquad (1)$$

$$L_1 - L_2 = 2 \times (s_2 - d_2) \qquad (2)$$

From the above-mentioned equations (1) and (2), in order to prevent air inclusions and wrinkles between the side-reinforcing rubber 2A and the carcass member 4A, it is preferred that the space between these first drums 11a and 11b is decreased by $(2 \times (s_1 - d_1))$ and the space between the bead-gripping rings 30A is decreased by $(2 \times (s_2 - d_2))$ from the moment of bringing the point $P_1$ into contact with the inner circumferential face of the carcass member to the moment of radially expanding the first drums 11a, 11b by $(2 \times r_1)$, so that the operation of the first drums 11a, 11b and the bead-gripping rings 30A are synchronized.

Figure 8:
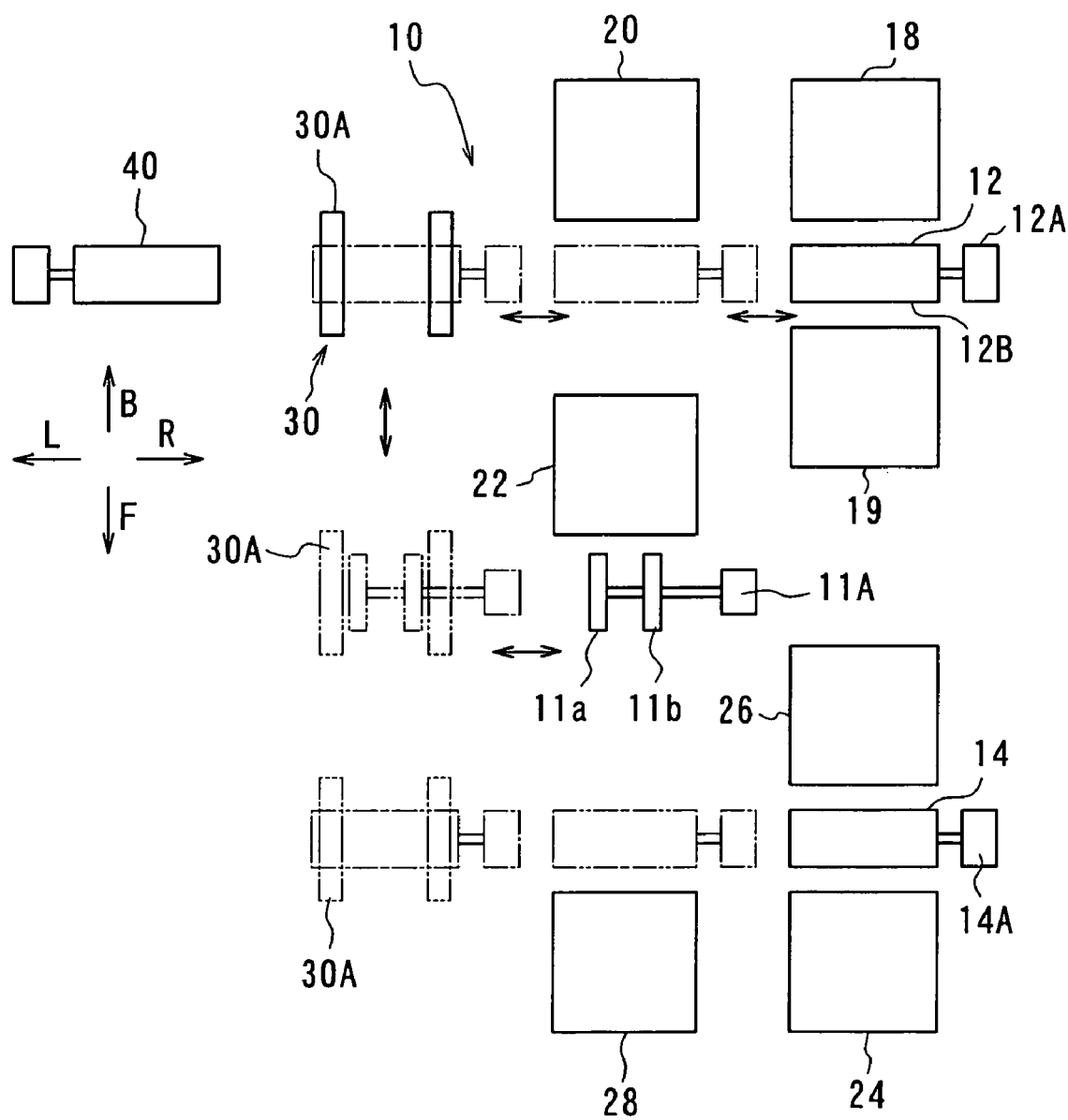
FIG. 8 is a layout diagram of an example of a building system.

FIG. 8 is a layout diagram showing an example of a building system used for the above-mentioned method of manufacturing the tire. The building system 10 includes a pair of first drums 11a, 11b which are rotated by a rotational driving device 11A and travel in the directions indicated by the arrows L and R, a second drum 12 which is rotated by a rotational driving device 12A and travels in the directions indicated by the arrows L and R, a carcass band drum 14 which is rotated by a rotational driving device 14A and travels in the directions indicated by the arrows L and R, a transfer cart 30 which has bead-gripping rings 30A and transfers bead cores 6, a cylindrical carcass member 4A, first, second and third cylindrical members 13, 15 and 17, respectively, in the directions indicated by the arrows F and B, and a shaping drum 40 which receives the third cylindrical member 17 from the transfer cart 30 and toroidally inflates the center portion of the cylindrical member 17.

The system is also equipped with a side-reinforcing rubber-attaching device 22 for attaching side-reinforcing rubbers 2A on the first drums 11a, 11b; an inner liner-attaching device 18, a canvas chafer-attaching device 19 and a squeegee rubber-attaching device 20 for attaching an inner liner rubber 8A, canvas chafer members 16A and a squeegee rubber (not shown), respectively, on the second drum 12; the first and second carcass member-attaching device 24, 26 for attaching two plies of the carcass members on the carcass band drum 14; and a squeegee rubber-attaching device 28 for attaching a squeegee rubber (not shown).

Figure 9:
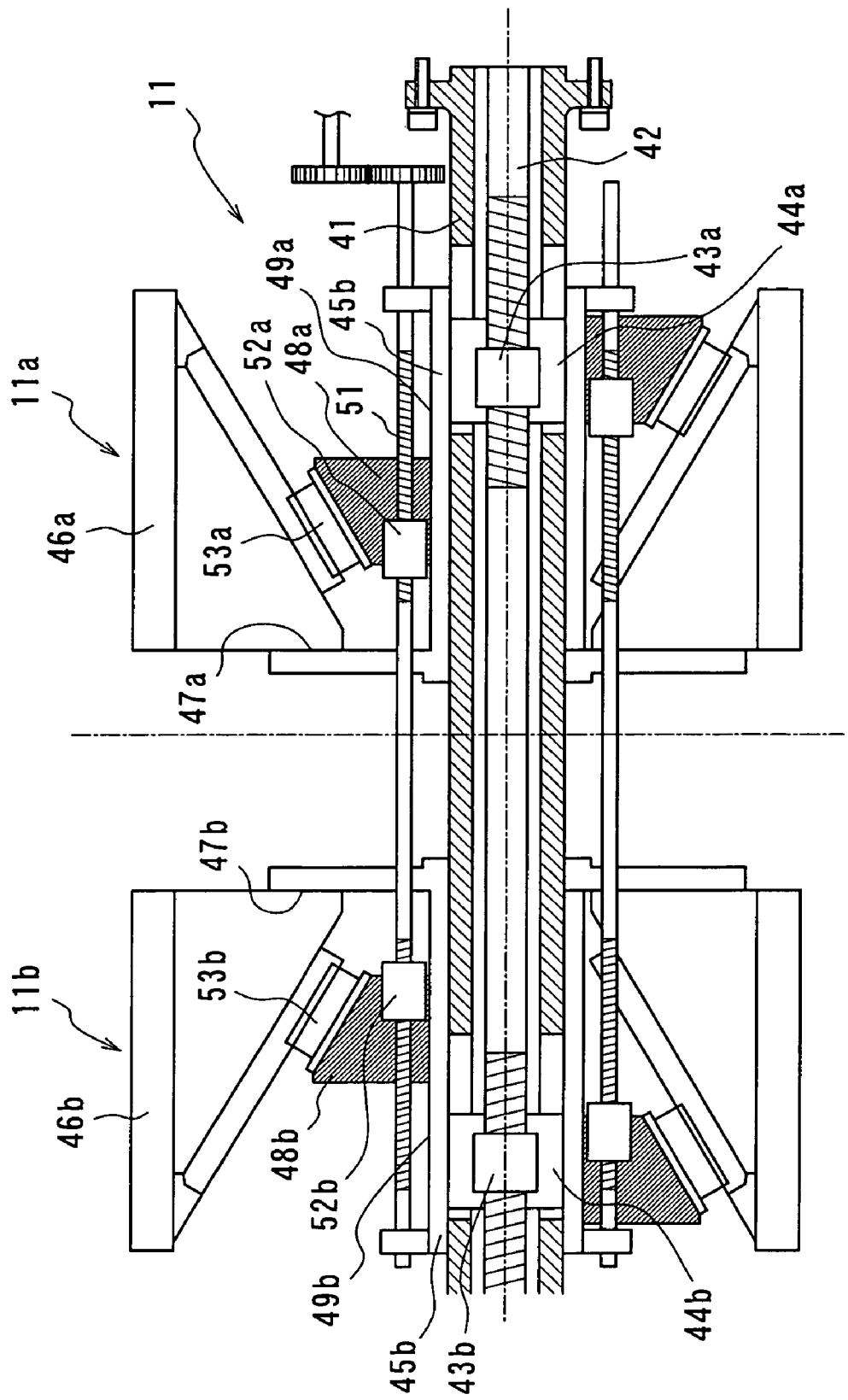
FIG. 9 is a sectional view of a constitutional example of the first drums.
Figure 10:
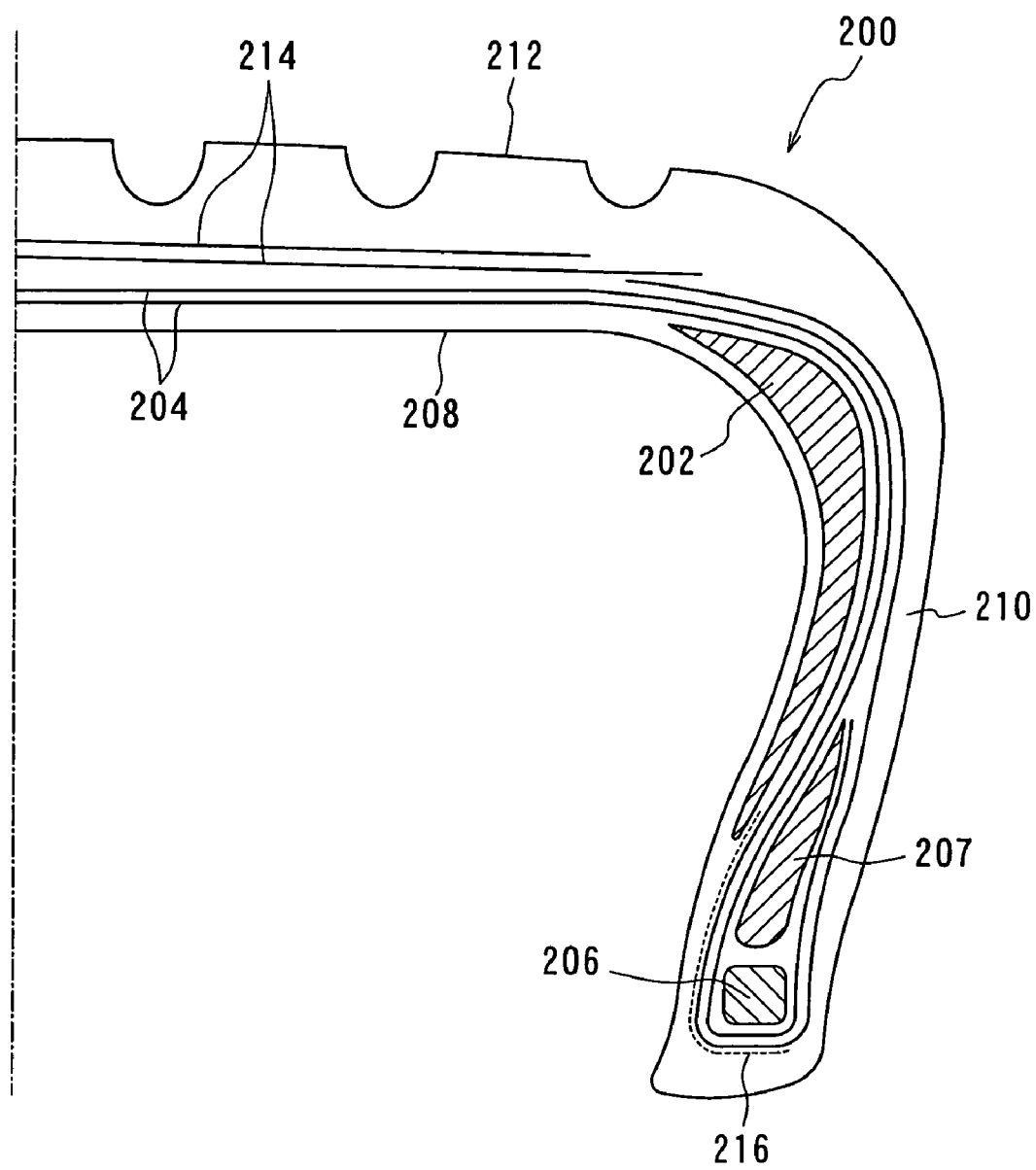
FIG. 10 is a meridian sectional view of a conventional side-reinforced type runflat tire.
Figure 11:
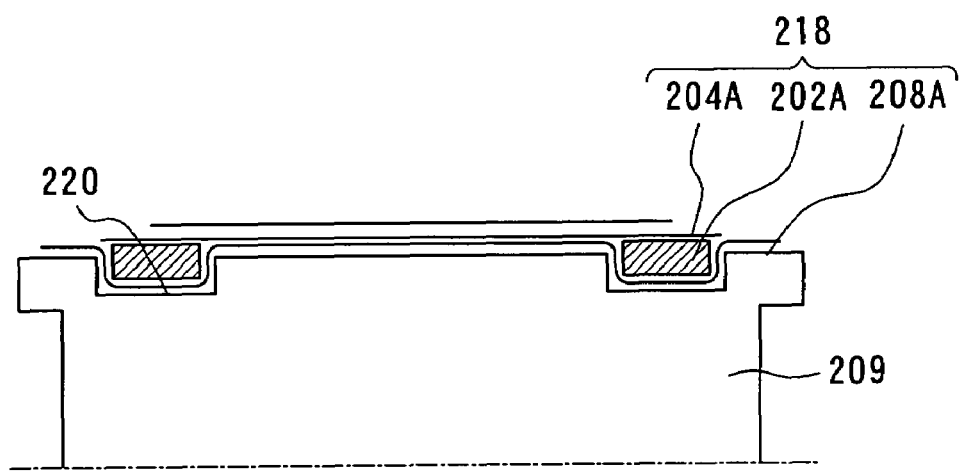
FIG. 11 is a sectional view showing a green tire for a conventional runflat tire during the manufacturing.

In this system, each of the carcass band drum 14 and the second drum 12 is expansible and contractible and is consisted of a commonly used tire drum with its diameter being substantially the same along the width direction (e.g. a device disclosed in Japanese Patent Application Laid-open No. 05-305682). The first drums 11a, 11b are expansible and contractible, have a diameters being substantially the same along the width direction, and are so disposed that they mutually move back and forth with a given symmetry plane being as their center of the movement. FIG. 9 is a sectional view of a constitutional example of the first drums 11a, 11b showing at a section passing the axial center.

Each of the first drums 11a, 11b is provided with sliders 45a, 45b axially traveling back and force on a main shaft 41 rotated by the rotational driving device 11A; plural segments 46a, 46b which are adjacent with each other in the circumferential direction and radially expand/contract along faces 47a, 47b of the sliders 45a, 45b perpendicular to the main shaft 41; and cone bodies 48a, 48b having direct action guides 53a, 53b which can axially travel back and forth on peripheral face 49a, 49b of the sliders 45a, 45b and guide the segments 46a, 46b at the conical face portions. In a hollow portion which is formed in the main shaft 41, there are provided a ball screw 42 for displacing the drum having right and left threaded sections with their lead angles being mutually opposite in direction, and screw blocks 43a, 43b screwed with the right and left threaded sections to displace in mutually opposite directions. Radially outside of the main shaft 41, there are provided ball screws 51 for expanding/contracting the drum which has right and left threaded sections with their lead angle being mutually opposite in direction and are journaled by the sliders 45a, 45b to be rotated by a not-shown rotational driving device, and screw blocks 52a, 52b screwed with the right and left threaded sections of the ball screw 51 to displace in mutually opposite directions.

In the thus-configured drums 11a, 11b, by rotating the drum-displacing ball screw 42 and the drum-expanding/contracting ball screw 51 in such a way that the screw blocks 43a, 43b are displaced in sync with the screw block 52a, 52b, entire the drums 11a, 11b can be moved back and forth in relation to each other without involving an expansion or a contraction of the segments 46a, 46b. In addition, only an expansion and a contraction of the segments 46a, 46b can be conducted by rotating the drum-expanding/contracting ball screw 51 alone.

In FIG. 9, the drum id defined into four regions by the lateral and vertical centerlines. The upper left region shows a state where the segment 46b is radially outwardly expanded and is axially inwardly displaced. The lower left region shows a state where the segment 46b is radially inwardly contracted and is axially outwardly displaced. The upper right region shows a state where the segment 46a is radially outwardly expanded and is axially inwardly displaced. The lower right region shows a state where the segment 46a is radially inwardly contracted and is axially outwardly displaced.

INDUSTRIAL APPLICABILITY

As having been clearly shown in the above, according to the present invention, the first drums 11a, 11b on which the side-reinforcing rubber 2A is to be attached is so configured that their diameters are substantially the same along the axial line, so that the tire can be produced by a multi-size mixed flow production system of minimum equipments. In addition, the radially expanding operation of the first drums, the mutually approaching operation of the first drums 11a, 11b and the mutually approaching operation of the bead-gripping rings 30A are synchronized to tightly press the inner circumferential face of the carcass member 4a against the outer circumferential face of the side-reinforcing rubber 2A, so that air inclusions and wrinkles can be avoided between these members.

The invention claimed is:

1. A method of manufacturing a tire provided with a carcass toroidally extending between both bead cores, an inner liner disposed in the inner circumferential side of the carcass and side-reinforcing rubber layers with generally crescent-shaped section interposed between the carcass and the inner liner, the method comprising;

a first step of gripping each of a pair of bead cores with a bead-gripping ring, said bead cores being so disposed that they contact with the outer peripheral face of a cylindrically-shaped carcass member over an entire periphery and are spaced from each other in the axial direction;

a second step of attaching the side-reinforcing rubbers on the peripheries of a pair of a first expansible/contractible drum with a diameter being substantially the same along the axial direction, said drums being provided in such a manner that they can mutually move back and forth on the same axial line;

a third step of inserting said first drums into the radially inward of said carcass member, radially expanding the drums, pressing the side-reinforcing rubber against the inner circumferential face of the carcass member to form a first cylindrical member and thereafter removing the first drums from the radially inward of the first cylindrical member;

a forth step of attaching at least one member including an inner liner rubber on the periphery of a second expansible/contractible drum with a diameter being substantially the same along the axial direction to form a second cylindrical member;

a fifth step of inserting said second drum on which said second cylindrical member is attached into the radially inward of said first cylindrical member, radially expanding the drum, pressing the second cylindrical member against the inner circumferential face of the first cylindrical member to form a third cylindrical member; and a sixth step of deforming a part of the third cylindrical member extending between the both bead cores into a toroidal shape, attaching a belt member and a tread rubber thereon to form a green tire, and setting and vulcanizing the green tire in a mold, wherein the radially-expanding operation of the first drums, the mutually-approaching operation of the first drums and the mutually-approaching operation of the bead-gripping rings are so synchronized in the third step that the inner circumferential face of the carcass member is tightly pressed against the outer circumferential face of the side-reinforcing rubber.

2. The method of manufacturing a tire according to claim 1, wherein, assuming that $P_1$ is the radially outermost point in the meridian line section of the side-reinforcing rubber after the first drum having been expanded, $P_2$ is the axially innermost point, $P_3$ is the axially outermost point, $r_1$ is the radial distance between $P_1$ and $P_2$, $d_1$ is the axial distance between $P_1$ and $P_2$, $d_2$ is the axial distance between $P_2$ and $P_3$, $s_1$ is the peripheral distance between $P_1$ and $P_2$, and $s_1$ is the peripheral distance between $P_2$ and $P_3$ via $P_1$, while the pair of the first drums are radially expanded in the third step, the radial expansions of the pair of the drums are synchronized, as well as the space between the first drums is decreased by $(2\times(s_1-d_1))$ and the space between the bead-gripping rings is decreased by $(2\times(s_2-d_2))$ after the point $P_1$ abuts the inner circumferential face of the carcass member and before the first drums are radially expanded by $(2\times r_1)$, so that the operations of the first drums and the bead-gripping rings are synchronized.

3. The method of manufacturing a tire according to claim 1, wherein in the second step, when the side-reinforcing rubber is applied, a continuous unvulcanized rubber ribbon is wound around in plural turns on the periphery of the first drum.

4. The method of manufacturing a tire according to claim 2, wherein in the second step, when the side-reinforcing rubber is applied, a continuous unvulcanized rubber ribbon is wound around in plural turns on the periphery of the first drum.

* * * * *